United States Patent
Mohrlock et al.

(10) Patent No.: US 9,393,851 B2
(45) Date of Patent: Jul. 19, 2016

(54) STABILIZER ARRANGEMENT FOR A WHEEL SUSPENSION OF MOTOR VEHICLES

(71) Applicant: AUDI AG, Ingolstadt (DE)

(72) Inventors: Dominik Mohrlock, Buxheim (DE); Hans-Jürgen Langhoff, Lenting (DE)

(73) Assignee: AUDI AG, Ingoldstadt (DE)

( * ) Notice: Subject to any disclaimer, the term of this patent is extended or adjusted under 35 U.S.C. 154(b) by 0 days.

(21) Appl. No.: 14/646,811

(22) PCT Filed: Oct. 30, 2013

(86) PCT No.: PCT/EP2013/003272
§ 371 (c)(1),
(2) Date: May 22, 2015

(87) PCT Pub. No.: WO2014/079533
PCT Pub. Date: May 30, 2014

(65) Prior Publication Data
US 2015/0298521 A1    Oct. 22, 2015

(30) Foreign Application Priority Data
Nov. 23, 2012  (DE) .......................... 10 2012 022 889

(51) Int. Cl.
*B60G 21/055*  (2006.01)
*B60G 3/20*    (2006.01)
*B60G 7/00*    (2006.01)

(52) U.S. Cl.
CPC .............. *B60G 21/0551* (2013.01); *B60G 3/20* (2013.01); *B60G 7/001* (2013.01); *B60G 7/006* (2013.01);

(Continued)

(58) Field of Classification Search
CPC ............... B60G 21/0551; B60G 2204/1224; B60G 7/001; B60G 2200/144
USPC ........................................... 280/5.5, 124.152
See application file for complete search history.

(56) References Cited

U.S. PATENT DOCUMENTS 4,113,278 A  *  9/1978  Rissberger  .........  B60G 21/0551
                                              280/124.106
4,798,397 A       1/1989  Komiya
(Continued)

FOREIGN PATENT DOCUMENTS

DE        14 30 899      5/1964
DE        1 937 143      2/1971
(Continued)

OTHER PUBLICATIONS

International Search Report issued by the European Patent Office in International Application PCT/EP2013/003272.

*Primary Examiner* — Faye M Fleming
(74) *Attorney, Agent, or Firm* — Henry M. Feiereisen LLC.

(57) ABSTRACT

A stabilizer arrangement in a wheel suspension for a motor vehicle includes a rotatably supported center part oriented in the vehicle transverse direction, and at least one leg projecting from the center part in the vehicle longitudinal direction and articulated via a substantially vertically extending rod with a control arm of the wheel suspension. A joint connection is arranged between the rod and the control arm outside a vehicle longitudinal member by a transverse clearance in the vehicle transverse direction, when the vehicle is in the compressed state. The rod is articulated to the control arm such that its force vector extending through the joint connections of the rod extends through the center axis defined by the control arm bearings.

14 Claims, 4 Drawing Sheets

(52) U.S. Cl.
CPC .............. *B60G 7/008* (2013.01); *B60G 21/055* (2013.01); *B60G 21/0553* (2013.01); *B60G 2200/18* (2013.01); *B60G 2200/422* (2013.01); *B60G 2202/135* (2013.01); *B60G 2204/1224* (2013.01); *B60G 2204/143* (2013.01); *B60G 2204/148* (2013.01)

(56) References Cited

U.S. PATENT DOCUMENTS

| | | | |
|---|---|---|---|
| 4,989,894 | A | 2/1991 | Winsor et al. |
| 5,560,651 | A | 10/1996 | Kami et al. |
| 6,105,984 | A | 8/2000 | Schmitz et al. |
| 6,296,418 | B1 | 10/2001 | Birkwald et al. |
| 6,357,772 | B1 * | 3/2002 | Pelz .................... B60G 3/18 280/124.135 |
| 8,505,938 | B2 * | 8/2013 | King .................... B60G 3/20 267/190 |
| 8,579,313 | B2 * | 11/2013 | Lee .................... B60G 17/0162 280/124.106 |
| 8,646,787 | B2 | 2/2014 | Langhoff |
| 8,919,794 | B2 * | 12/2014 | Kunert .................... B60G 3/20 280/124.107 |
| 8,925,945 | B2 | 1/2015 | Mohrlock et al. |
| 8,967,670 | B2 | 3/2015 | Mohrlock et al. |
| 2009/0057528 | A1 * | 3/2009 | Moravy ................ B60G 15/063 248/674 |
| 2013/0257006 | A1 * | 10/2013 | Kunert .................... B60G 3/20 280/124.136 |

FOREIGN PATENT DOCUMENTS

| | | |
|---|---|---|
| DE | 1 940 678 | 2/1971 |
| DE | 195 22 336 | 12/1995 |
| DE | 198 07 128 | 9/1999 |
| DE | 199 03 435 A1 | 8/2000 |
| DE | 103 44 995 | 4/2005 |
| DE | 10 2004 003 149 | 8/2005 |
| DE | 10 2004 004 888 | 9/2005 |
| DE | 10 2004 030 463 | 1/2006 |
| DE | 10 2006 042 376 | 3/2007 |
| DE | 199 03 435 B4 | 10/2008 |
| DE | 10 2010 030 292 | 12/2011 |
| EP | 0 970 877 | 1/2000 |
| EP | 1 262 396 | 12/2002 |
| EP | 1 609 631 | 12/2005 |
| GB | 2 442 716 | 4/2008 |
| WO | WO 2012/001934 | 1/2012 |

* cited by examiner

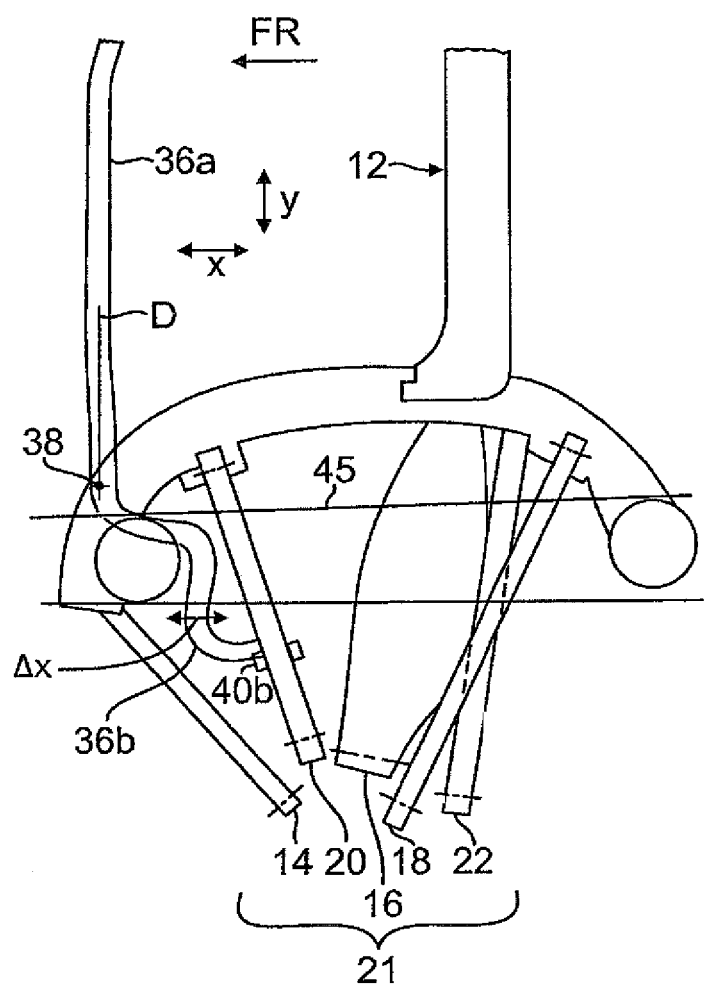

STABILIZER ARRANGEMENT FOR A WHEEL SUSPENSION OF MOTOR VEHICLES

CROSS-REFERENCES TO RELATED APPLICATIONS

This application is the U.S. National Stage of International Application No. PCT/EP2013/003272, filed Oct. 30, 2013, which designated the United States and has been published as International Publication No. WO 2014/079533 and which claims the priority of German Patent Application, Serial No. 10 2012 022 889.9, filed Nov. 23, 2012, pursuant to 35 U.S.C. 119(a)-(d).

BACKGROUND OF THE INVENTION.

The present invention relates to a stabilizer arrangement for a wheel suspension of motor vehicles.

For example, DE 10 2004 030 463 A1 discloses a rear wheel suspension with a plurality of spatially offset lower and upper control arms and a U-shaped transverse stabilizer, with the center part of the stabilizer being supported on a common subframe anteriorly of the wheel rotation axes, and with the rearwardly projecting legs of the stabilizer being coupled via substantially vertically aligned rods in an articulated manner with an upper control arm of the wheel suspension.

SUMMARY OF THE INVENTION.

Against the background of such a stabilizer arrangement, it is an object of the present invention to provide a stabilizer arrangement which is improved in terms of kinematic design and arrangement.

According to one aspect of the invention, the object is attained by a stabilizer arrangement in a wheel suspension for a motor vehicle, including a rotatably supported center part oriented in the vehicle transverse direction, and at least one leg projecting from the center part in the vehicle longitudinal direction and articulated via a substantially vertically extending rod with a control arm of the wheel suspension, with a joint connection being arranged between the rod and the control arm, in particular in the compressed state of the vehicle, in the vehicle transverse direction about a transverse clearance outside of a vehicle longitudinal member. The joint connection formed between the substantially vertically extending rod and the control arm is thus arranged beneficially in terms of packaging in the vehicle transverse direction outside the vehicle longitudinal member and roughly at its level.

The afore-mentioned control arm of the wheel suspension can be part of a particular resolved multilink assembly, and preferably a front upper control arm, as viewed in the travel direction, which control arm extends below the vehicle longitudinal member. For an arrangement that is beneficial in term of packaging, it is of advantage when the front upper control arm is curved downwards substantially V-shaped or U-shaped. In this case, the control arm has arc sections which converge at a lower apex point in an approximately V-shaped manner. The lower apex point of the V-shaped curvature can be arranged with vertical clearance below the vehicle longitudinal member, when the vehicle is in the compressed state. The afore-mentioned joint connection between the rod and the upper front control arm is preferably provided on the outer control arm arc section in the transverse direction.

The multilink assembly can also have a front lower control arm which, as viewed in the travel direction, is spaced from the front upper control arm via a longitudinal clearance. It is especially beneficial, when the leg of the transverse stabilizer extends within the longitudinal clearance to the lower joint connection with the rod.

The upper and lower control arms of the multilink assembly can preferably be supported on a subframe of a rear wheel suspension. In addition, the transverse stabilizer may be rotatably supported via at least one stabilizer bearing on the subframe. Preferably, the stabilizer rotation axis defined by the stabilizer bearing can be positioned below the subframe. In this way, there is sufficient installation space, especially when using an active stabilizer system, below the front crossbar of the subframe, for arrangement of a rotary actuator of the active stabilizer system.

It is particularly preferred when the force vector, extending through the joint connections of the rod, extends substantially through the center axis defined by the control arm bearings. This arrangement ensures that the rod coupled with the stabilizer does not exert tilting moments or torques on the control arm or on the control arm bearings thereof. This has the particular advantage that the control arm bearings are not constrained, so that less noise is transmitted to the body of the motor vehicle and optionally can be designed softer to achieve an improved riding comfort.

In a multilink axle, it is particularly preferred, when the center part of the stabilizer can be supported at the height level of a lower control arm of the wheel suspension, with the rod being aligned upwardly and articulated to an upper control arm. This enables a structurally advantageous integration of the stabilizer with beneficial attachment of the rod on the upper control arm of the wheel suspension.

To realize a necessary clearance of the upper control arm in the wheel suspension, it may be particularly suitable, when the control arm is bent approximately U-shaped, as viewed in the vehicle longitudinal direction, and the rod is articulated to the higher and outer portion of the control arm. This advantageously contributes to a stabilization of the control arm position in the wheel suspension and provides beneficial translation ratios near 0.8 between the spring travel of the wheel and the adjustment path of the rod acting on the stabilizer.

Preferably, the center part of the stabilizer can, in a manner known per se, be positioned, as viewed in travel direction of the motor vehicle, anteriorly of the wheel rotation axis of the wheels. In addition, the rod articulated to the leg and the control arm can be configured in the shape of an arc between the joint connections so as to provide a clearance in particular to the control arm and, optionally, to a wheel drive shaft, when the wheel of the wheel suspension are driven.

It is especially preferred to design the joint connections of the rod as a rubber-metal sleeve bearing, with the pivot axis of the joint connection on the side of the control arm being oriented in vehicle longitudinal direction. As a result of the thus-attained axial guidance of the sleeve bearing, twisting or tilting of the control arm can be effectively prevented, even when the joint connection is positioned laterally next to the control arm. It may hereby be suitable when the pivot axis of the joint connection or the sleeve bearing of the rod extends at the stabilizer leg in the vehicle transverse direction.

In a preferred arrangement in terms of both clearance reasons and kinematics, the legs of the stabilizer can be oriented in substantial parallel relationship to the lower control arm of the wheel suspension, which control arm extends to the outside obliquely rearwardly and within the control arm, as viewed in plan view, with their joint connections with the rod lying substantially vertically below the joint connection with the upper control arm in design position of the wheel suspension.

Finally, the upper and lower control arms of the wheel suspension and the center part of the stabilizer may be articulated or supported on a subframe of the rear wheel suspension of the motor vehicle and, consequently, form a complete assembly unit for installation in a motor vehicle.

BRIEF DESCRIPTION OF THE DRAWING

An exemplary embodiment of the invention will now be described in greater detail with reference to the accompanying drawings. It is shown in:

FIG. 5 a partial view from above of the multilink assembly of the wheel suspension.

DETAILED DESCRIPTION OF PREFERRED EMBODIMENTS

Figure 1:
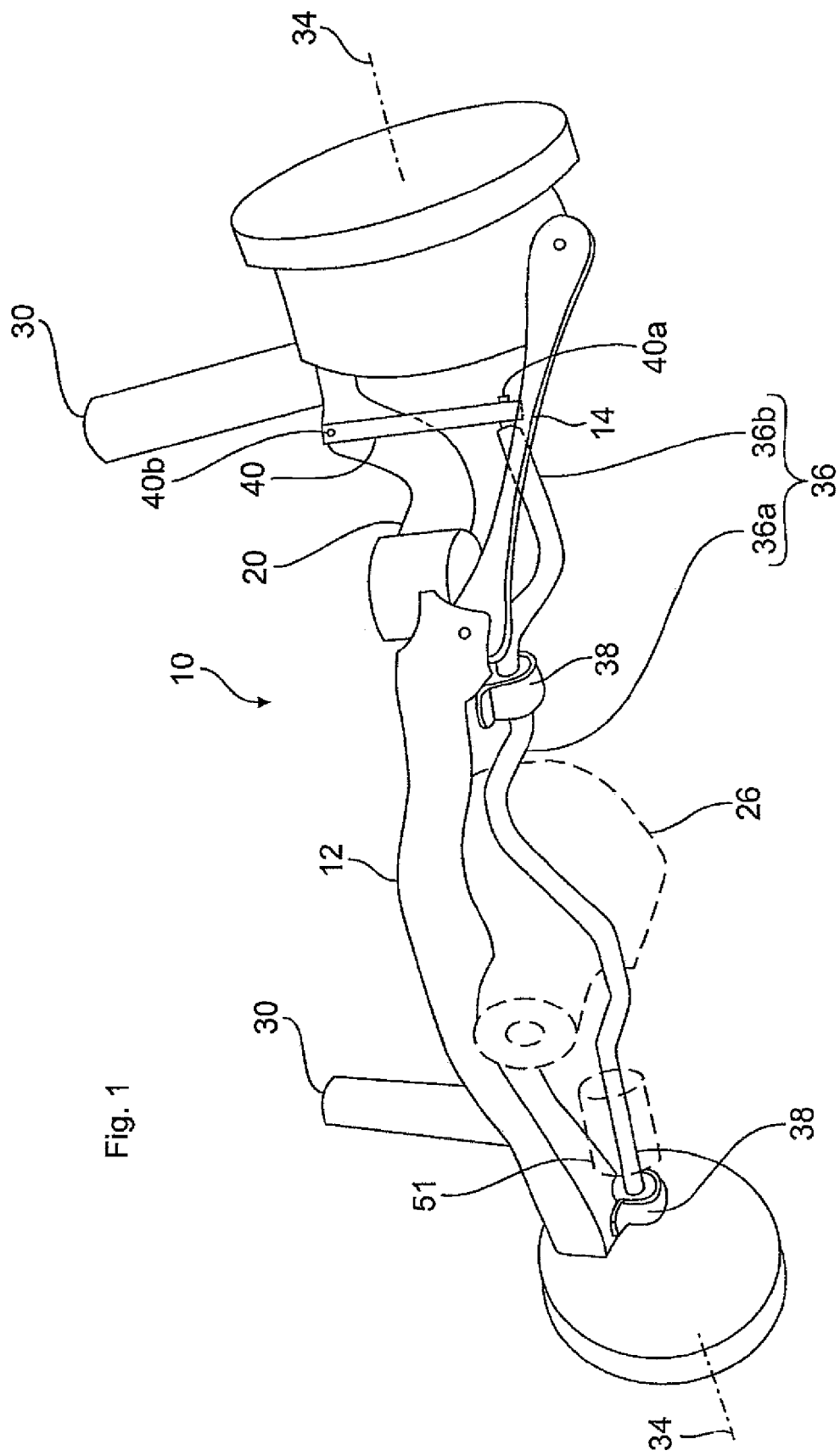
FIG. 1 a three-dimensional illustration of a rear axle for a motor vehicle, with each wheel suspension having several lower and upper control arms and a stabilizer arrangement with a center part rotatably supported on a subframe and rearwardly projecting legs which are articulated to upper control arms via rods.

FIG. 1 shows a rear axle 10 for motor vehicles, which is described only insofar as it is necessary for the understanding of the present invention.

Figure 2:
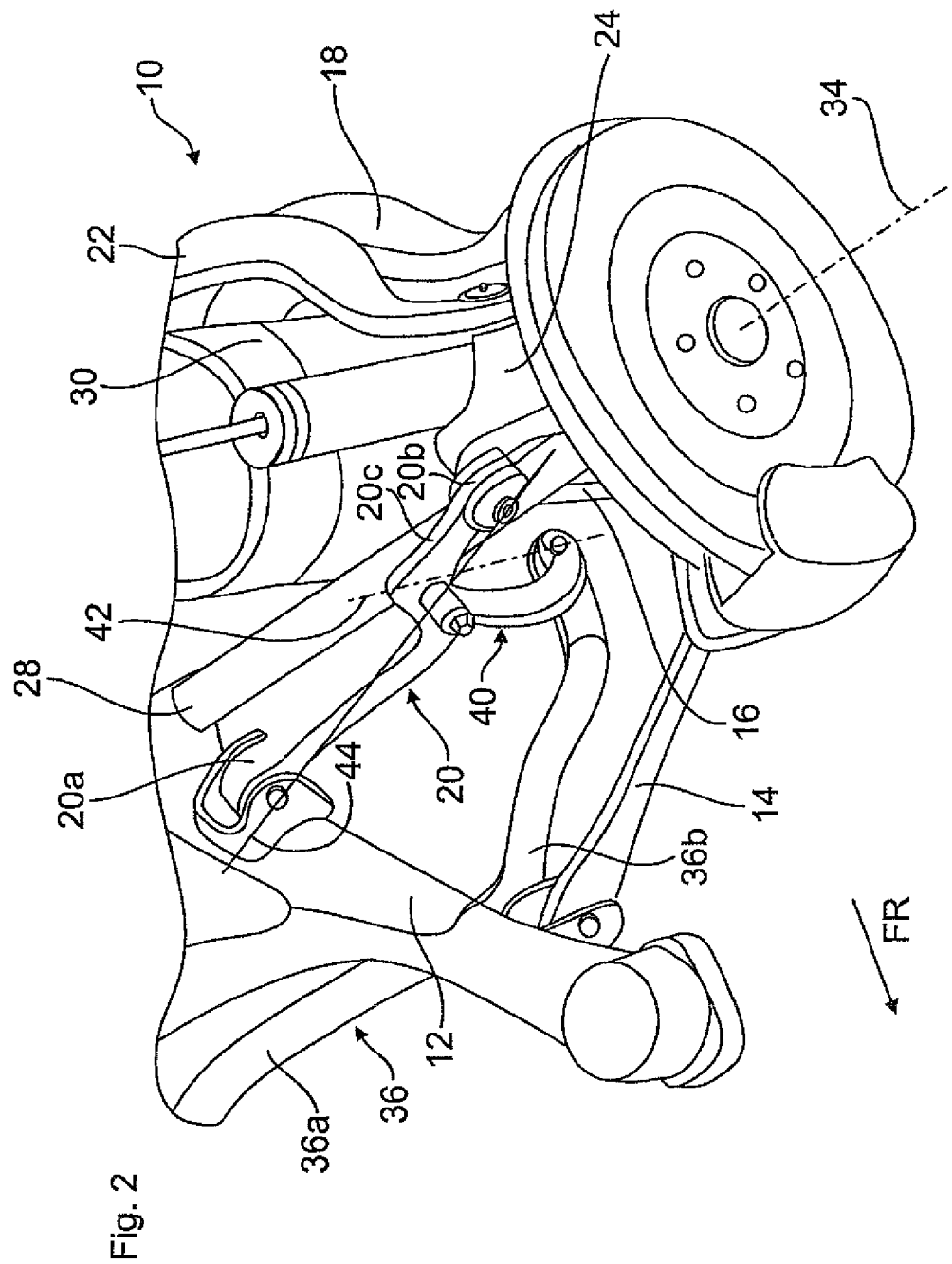
FIG. 2 a front and top view of the left-hand wheel suspension, showing the corresponding stabilizer leg, the upwardly projecting rod and its connection to the upper control arm.

The rear axle 10 includes a subframe 12, which in plan view is substantially rectangular and comprised of longitudinal bars and transverse bars, and to which lower control arms 14, 16, 18 (see also FIG. 2) and upper control arms 20, 22 are articulated for the wheel suspensions on both sides in spatially offset arrangement via control arm bearings (without reference signs).'

The control arms 14 to 22 are attached via control arm bearings on wheel carriers 24 on both sides. The wheel carriers 24 with respective wheel bearings carry the rear wheels (not shown) of the motor vehicle.

Further suspended to the subframe 12 is a rear axle differential gear 26, indicated only by dashed lines, to propel the rear wheels via transverse drive shafts. Further shown in FIG. 1 are telescopic shock absorbers 30, provided in a known manner for cushioning and damping the body of the motor vehicle.

A U-shaped transverse stabilizer 36 is arranged in travel direction FR of the motor vehicle anteriorly of the wheel rotation axes 34 and at level with the lower control arm 14 and has a center part 36a which extends in vehicle transverse direction and is rotatably supported on the subframe 12 via stabilizer bearings 38.

The stabilizer 36 has legs 36b which project in opposition to the travel direction FR rearwards and obliquely to the outside and are articulated with their free ends with the upper front control arm 20 of the wheel suspensions via upwardly projecting rods 40, respectively.

The joint connections 40a, 40b of the rods 40 (FIGS. 3 and 4) with the legs 36b of the stabilizer 36 and with the control arms 20 are realized by rubber-metal sleeve bearings (silent blocs) known per se, with the drawn bearing center axes.

Figure 3:
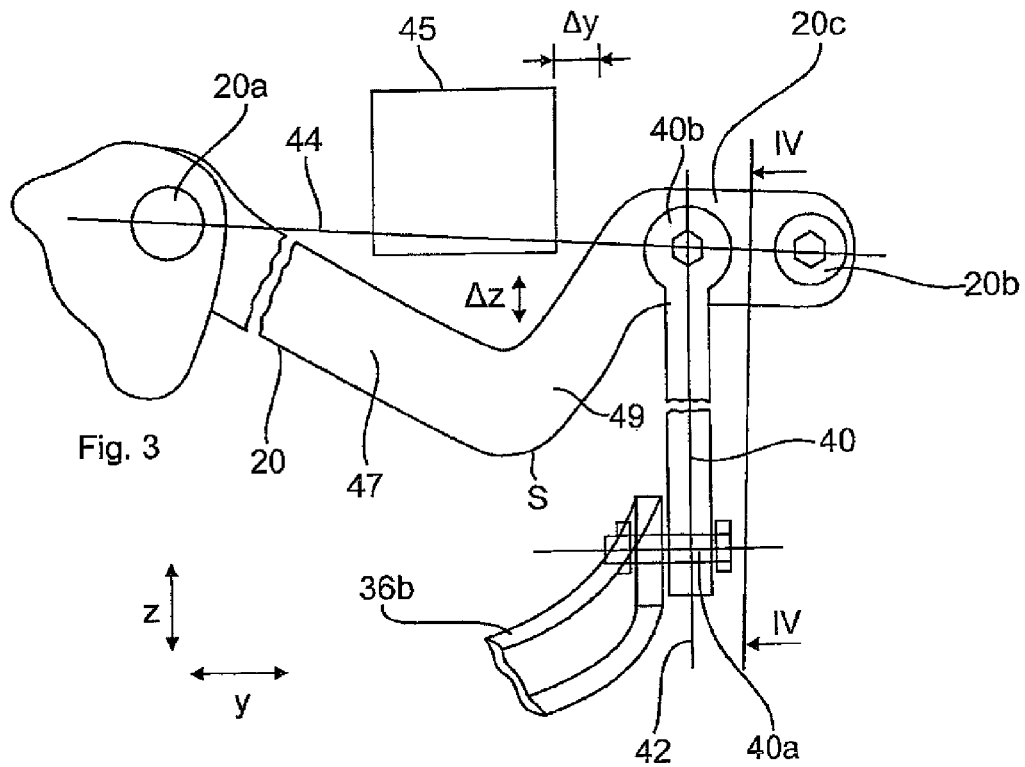
FIG. 3 a sketchy illustration of a view in opposition to the travel direction of the motor vehicle onto the upper control arm and the articulated rod of the stabilizer of the wheel suspension according to FIG. 2.

FIG. 3 shows the wheel suspension in a compressed state of the motor vehicle. Accordingly, the joint connection 40b between the rod 40 and the front upper control arm 20 is arranged in the vehicle transverse direction y by a transverse clearance $\Delta y$ outside the vehicle longitudinal member 45. The control arm 20 extending below the vehicle longitudinal member 45 is also curved downwards substantially V-shaped to provide a vertical clearance $\Delta z$. The V-shaped curvature has, according to FIG. 3, two arc sections 47, 49 which converge at a lower apex point S, with the lower apex point S of the control arm 20 being spaced by the afore-mentioned vertical clearance $\Delta z$ from the underside of the vehicle longitudinal member 45.

As is further shown in FIG. 5, the front lower control arm 14 of the multilink assembly 21 is arranged via a longitudinal clearance $\Delta x$ anteriorly of the front upper control arm 20, as viewed in the travel direction FR. In terms of packaging, it is beneficial, when the leg 36b of the transverse stabilizer 36 extends within the longitudinal clearance $\Delta x$ to the joint connection 40a with the rod.

The stabilizer rotation axis D (FIG. 5) defined by the stabilizer bearing 38 is arranged below the subframe 12.

As mentioned above, the upper control arm 20 is curved downwards substantially in the shape of a U for clearance reasons and has an upper outer portion 20c to which the rod 40 is articulated via the joint connection 40b at level with a connecting straight line or a center axis 44 formed hereby between the control arms bearings 20a, 20b.

The joint connections 40a, 40b of the rod 40 with the stabilizer legs 36b of the stabilizer 36 and the control arms 20 are further configured such that the drawn force vector 42 (FIG. 4) of the rod 40 extends without longitudinal offset through the center axis 44 of the control arm 20 and therefore does not exert any torque on the control arm 20 in the presence of respective spring forces.

The rods 40 are also curved forwards or arc-shaped between the joint connections 40a, 40b to ensure a required clearance to the adjacent drive shafts 28.

Figure 4:
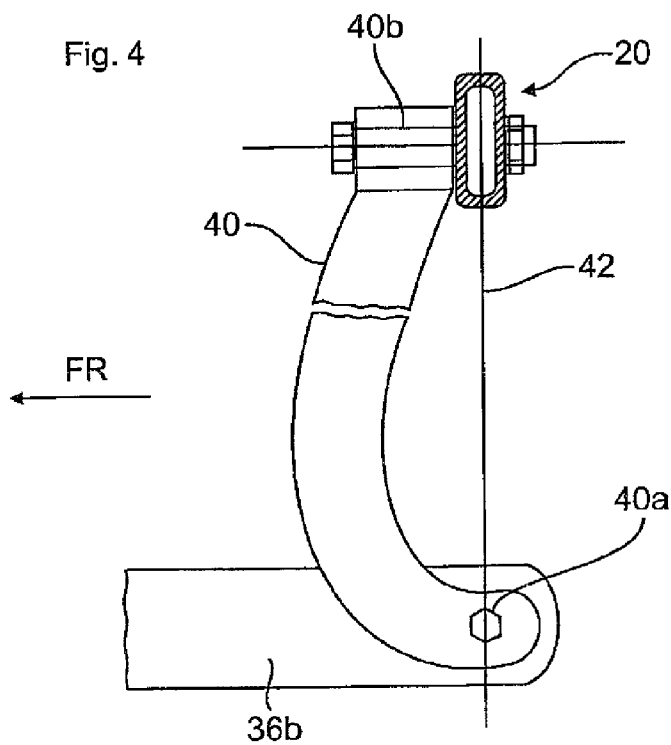
FIG. 4 a cross section along the line IV-IV of FIG. 3 through the control arm in the area of the joint connection with the rod.

Finally, oriented in substantial parallel relation to the lower control arm 14 of the wheel suspensions that extends obliquely rearwardly to the outside, are the legs 36b of the stabilizer (FIG. 2) which extend, as viewed in plan view, within the control arm 14, with their joint connection 40a lying with the rod 40 substantially vertically below the joint connection 40b with the upper control arm 20 (FIG. 4).

The invention is not limited to the illustrated embodiment. Instead of the single piece stabilizer 36, a two-piece version could also be provided with two center parts and with integrated actuators for level adjustment and/or for roll and pitch stabilization of the body of the vehicle.

The control arm bearings of the control arms 14 to 22 can be formed in known manner by rubber-metal sleeve bearings (body side) and/or by ball joints (wheel carrier side). The same applies to the joint connections 40a, 40b of the rods 40; however, their force vector 42 has to be oriented, as described above, through the control arm center axis 44. For example, the rods 40 could embrace the control arms 20 also in the shape of a fork.

Optionally, the wheel suspensions may also be arranged in the absence of a subframe 12 directly on the body of the motor vehicle.

The invention claimed is:

1. A wheel suspension for a motor vehicle, comprising:
a subframe;
a multilink assembly including, as viewed in a travel direction of the motor vehicle, a front upper control arm supported by control arm bearings which define a center axis, and a front lower control arm, said upper and lower control arms being supported on the subframe, said front lower control arm lying, as viewed in the travel direction travel, by a free space anteriorly of the front upper control arm; and
a stabilizer arrangement comprising
a transverse stabilizer having a rotatably supported center part oriented in a vehicle transverse direction, and at least one leg projecting from the center part in a vehicle longitudinal direction,
a substantially vertical rod configured to connect the at least one leg to the front upper control arm,
a first joint connection between the rod and the front upper control arm and arranged in the vehicle transverse direction by a transverse clearance outside a vehicle longitudinal member, and
a second joint connection between the rod and the at least one leg, with the at least one leg extending within the free space to the second joint connection with the rod,
wherein the rod is articulated to the front upper control arm such that a force vector of the rod extends through the first and second joint connections and through the center axis defined by the control arm bearings.

2. The wheel suspension of claim 1, wherein the multilink assembly extends below the vehicle longitudinal member.

3. The wheel suspension of claim 1, wherein the front upper control arm is curved downwards for providing a vertical clearance, and has two arc sections which converge at a lower apex point, said lower apex point being spaced by the vertical clearance from the vehicle longitudinal member.

4. The wheel suspension of claim 3, wherein the lower apex point is spaced by the vertical clearance from the vehicle longitudinal member in a fully compressed state of the motor vehicle.

5. The wheel suspension of claim 3, wherein the first joint connection is provided at an outer one of the arc portions, as viewed in the transverse direction.

6. The wheel suspension of claim 1, wherein the stabilizer arrangement includes at least one stabilizer bearing for rotatably supporting the transverse stabilizer on the subframe.

7. The wheel suspension of claim 6, wherein the stabilizer bearing defines a stabilizer rotation axis and is arranged beneath the subframe.

8. The wheel suspension of claim 1, further comprising a rotary actuator provided in a region below a front transverse bar of the subframe in the presence of an active stabilizer system.

9. The wheel suspension of claim 1, wherein the center part of the transverse stabilizer, as viewed in the travel direction of the motor vehicle, is positioned anteriorly of a wheel rotation axis of wheels.

10. The wheel suspension of claim 1, wherein the rod is configured between the first and second joint connections in an arc-shaped manner to provide a clearance to the front upper control arm.

11. The wheel suspension of claim 10, wherein the rod is distanced by the clearance to a wheel drive shaft.

12. The wheel suspension of claim 1, wherein the first and second joint connections of the rod are configured as rubber-metal sleeve bearings, with the first joint connection defining a pivot axis which is oriented in the vehicle longitudinal direction.

13. The wheel suspension of claim 1, wherein the second joint connection of the rod defines pivot axis which extends in the vehicle transverse direction.

14. The wheel suspension of claim 1, wherein the at least one leg of the transverse stabilizer is oriented in substantial parallel relationship to the front lower control arm which extends obliquely rearwards outwardly, said at least one leg extending, as viewed in a plan view, within the front lower control arm, wherein the second joint connection lies substantially vertically below the first joint connection.

\* \* \* \* \*